May 5, 1942.    O. W. YOUNG    2,281,905
OIL SEAL OR GUARD
Filed April 4, 1939    3 Sheets-Sheet 1

INVENTOR:
OTTO W. YOUNG,
BY
Gales P. Moore
HIS ATTORNEY.

May 5, 1942.　　　　O. W. YOUNG　　　　2,281,905

OIL SEAL OR GUARD

Filed April 4, 1939　　　　3 Sheets-Sheet 2

INVENTOR:
OTTO W. YOUNG,
BY Gales P. Moore
HIS ATTORNEY.

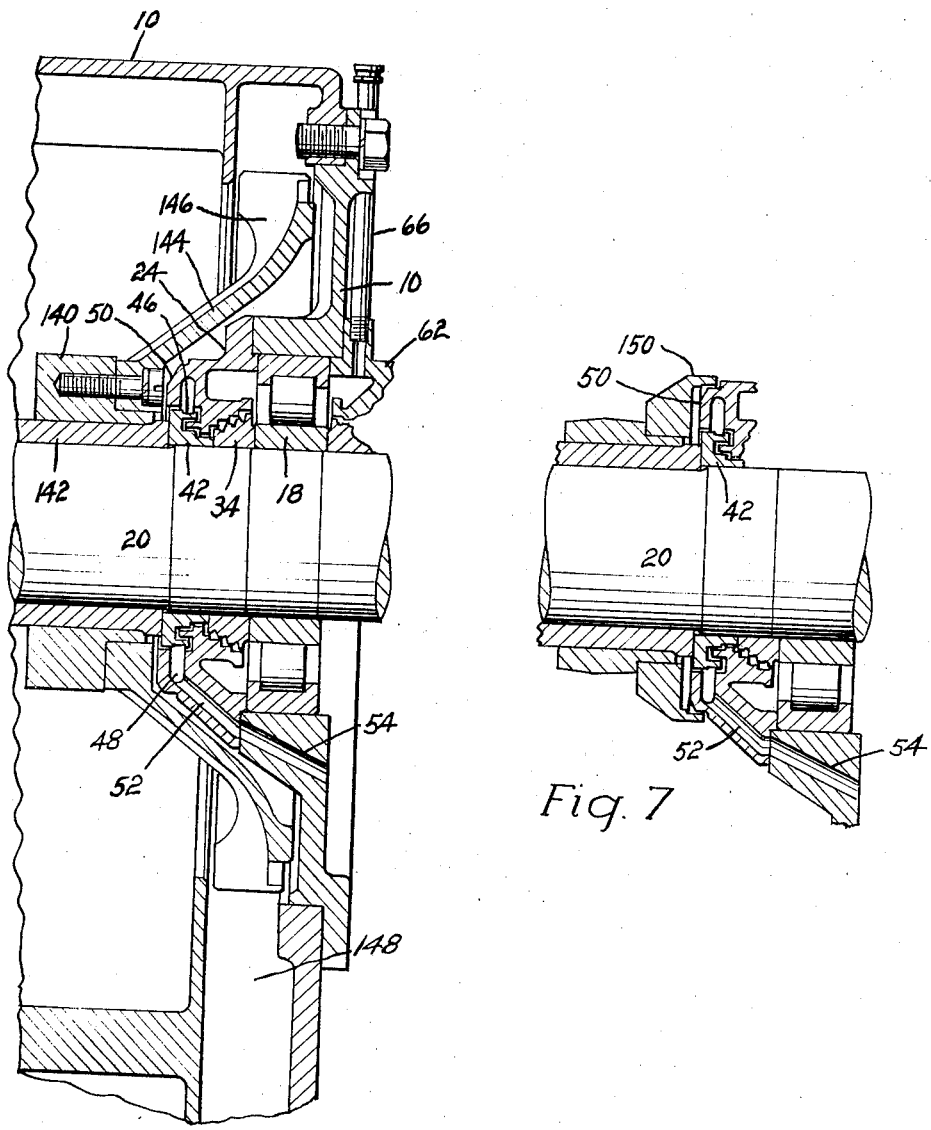

Patented May 5, 1942

2,281,905

UNITED STATES PATENT OFFICE 2,281,905

OIL SEAL OR GUARD

Otto W. Young, Maplewood, N. J., assignor to General Motors Corporation, Detroit, Mich., a corporation of Delaware Application April 4, 1939, Serial No. 265,945

7 Claims. (Cl. 286—5)

This invention relates to oil seals or guards and comprises all of the features of novelty herein disclosed. Grease has been used for lubricating the bearings in traction drive motors for electric locomotives but grease is not fluid and there is no practical way of checking the amount remaining in the bearings. The non-uniform rate of grease leakage under varying operating conditions and speeds may result in overfilling the bearings with grease at the predetermined regular lubricating periods and overgreasing results in churning and overheating especially at the high speed at which such motors run.

Accordingly, an object of the invention is to provide improved means for insuring proper lubrication of motor bearings. Another object is to provide sealing devices which will make it possible to successfully utilize oil for motor bearings especially in traction drive motors of electric locomotives. Another object is to provide improved seals or guards which will effectually prevent leakage of oil from the bearings and especially into the internal motor parts. Still another object is to provide the oil seals with means to insure against supplying more than a predetermined quantity of oil to the bearings. Yet another object is to provide a seal which will not only prevent leakage of oil from the bearings but will prevent the admission of gear lubricant or other foreign matter to the bearing lubricant.

To these ends and also to improve generally upon devices of this character, the invention consists in the various matters hereinafter described and claimed. In its broader aspects, the invention is not necessarily limited to the specific construction selected for illustrative purposes in the accompanying drawings in which Figure 1 is a vertical sectional view.

Figure 6 is a sectional view to small scale showing other elements pertaining to Fig. 1.

Figure 7 is a similar view indicating a modification.

Figure 1:
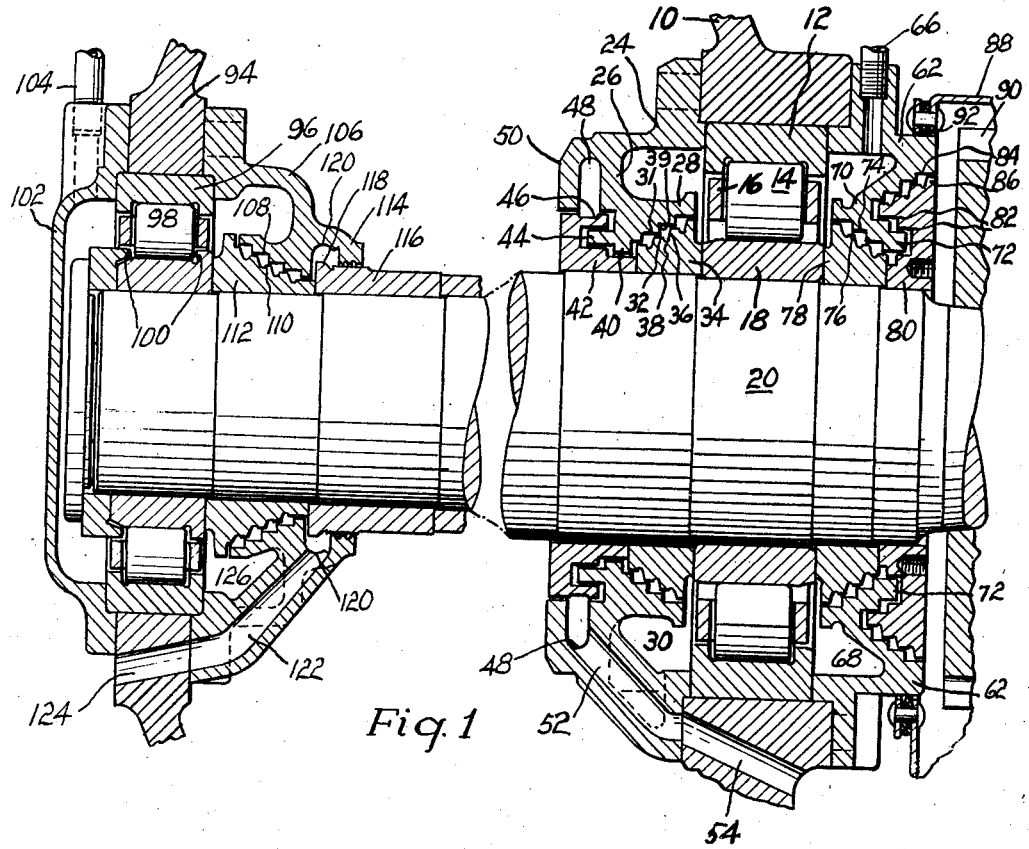

The numeral 10 indicates a motor-casing or end wall having a bore or seat for the outer race ring 12 of an antifriction bearing having rolling elements in the form of cylindrical rollers 14. The rollers are spaced apart by a cage 16 and run on an inner race ring 18 secured to a motor shaft 20, such as that of a traction drive motor of an electric locomotive. To provide adequate lubrication and prevent leakage of oil, the opposite sides of the bearing are covered by guards or sealing devices and the construction of these constitutes important aspects of the present invention.

A sealing plate or guard 24 has a flange suitably secured as by bolts to the end wall 10, the guard having a substantially radial wall 26 and a re-entrant wall or projecting flange 28 forming an annular space which is somewhat enlarged at the bottom to form an oil sump or reservoir 30. Internally the flange 28 is provided with a series of stepped cylindrical (or slightly tapering) surfaces 31 surrounding a series of steps or ribs 32 of progressively increasing diameter on a collar 34 which is tightly fitted to the shaft 20 against the inner race ring 18. Each rib has an externally cylindrical (or slightly tapering) surface lying very close to one of the surrounding surfaces 31 and all but the largest rib projects axially somewhat into the increased space or recess provided by the next larger adjacent surface 31. Each rib except the smallest one has a slanting side wall 36 merging into a drain groove 38 which is slightly smaller in diameter than the next adjacent rib. The slanting side walls 36 are quite widely spaced axially from the radial walls or shoulders 39 connecting the stepped surfaces 31.

The guard has a radial projection 40 closely surrounding a sleeve or collar 42 which tightly fits the shaft. The guard also has an axial projection 44 which enters a groove formed by the collar and by an overhanging flange 46 thereon to form a labyrinth. The flange 46 has an external groove facing an internal groove 48 formed in an extension 50 of the guard 24. All of the axially interfitting parts have close radial clearances to form labyrinths but the axial clearances are comparatively large to provide for variations or limits in manufacture and assembly and to allow for some axial shifting or expansion of the shaft due to heat.

Figures 2, 3:
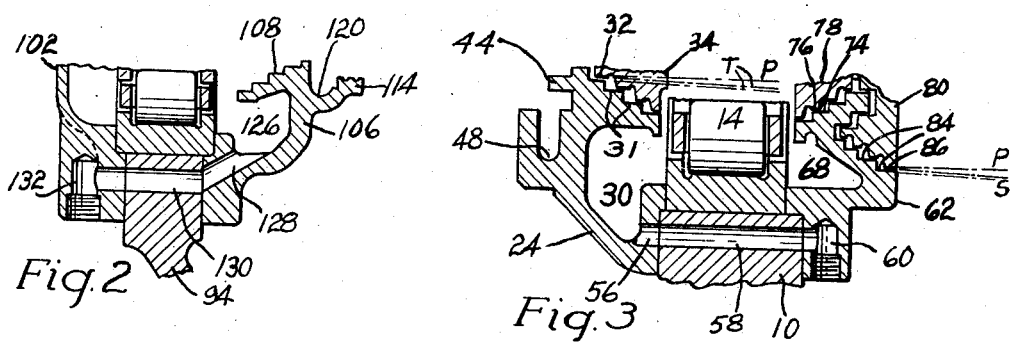
Figure 2 is a sectional view taken on the inclined plane indicated by section line 2—2 in Fig. 4.
Figure 3 is a sectional view taken on the inclined plane indicated by section line 3—3 of Figure 5 and disclosing a slight modification.
Figure 5:
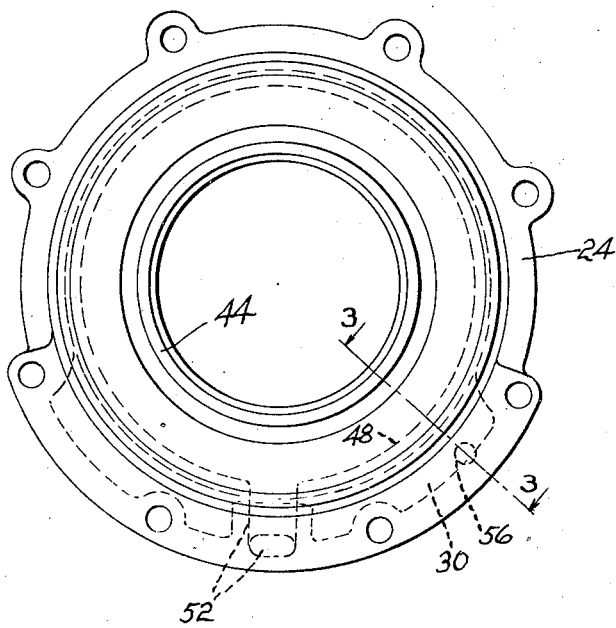
Figure 5 is an end view of another sealing plate or guard.

The ribs 32 and the surrounding surfaces 31 may be cylindrical as indicated in Fig. 1 or they may taper slightly as indicated in Fig. 3 wherein the line P is parallel to the bearing axis and the line T represents the taper of the surfaces, this taper extending in a direction to make such surfaces larger towards the bearing so that the ribs will tend to sling oil towards the bearing and into the next larger recess, thus resisting leakage. The bottom of the groove 48 communicates by an inclined leakage port 52 with an inclined drain port 54 through the casing wall 10 to conduct to the outside of the motor frame any oil which might get past the stepped ribs and the labyrinth beyond it. The sump or reservoir 30, as indicated in Figs. 3 and 5, has an overflow port 56 communicating by a passage 58 with a drain port 60 in a second sealing plate or guard 62 which is fastened to the end wall 10 on the outer side of the bearing. The overflow port 56 is located in front of the vertical central plane and preferably at such a height above the bottom of the sump as will fix the maximum oil level about at the center of the lowermost roller of the bearing. If any oil leaks or overflows from the oil receptacle or reservoir formed by the guard rings, it discharges outside of the motor casing either through the leakage ports 52 and 54 or the overflow bypass or telltale afforded by the ports 56, 58 and 60.

The guard 62 has an oil filler or stand pipe 66 to conduct oil to an annular recess 68 provided by an annular projection 70 having a small peripheral groove facing outwardly. The projection 70 slants inwardly towards the bearing while another projection 72 upon it slants inwardly away from the bearing. The interior of the projection 72 has a series of stepped cylindrical (or slightly tapering) surfaces 74 similar to the surfaces 31 and cooperating with a series of steps or ribs 76 similar to the ribs 32 and formed on a collar 78 tightly fitting the shaft 20 and engaging the race ring 18. Another collar 80 on the shaft has a pair of side recesses or grooves 82 to form a labyrinth with closely adjacent cylindrical surfaces on the projection 72. To facilitate assembly of the various collars and rings, the shaft 20 is preferably provided with a series of stepped cylindrical surfaces. The interior of the slanting projection 70 has a series of stepped cylindrical (or slightly tapered) surfaces 84 for cooperation with similar surfaces on ribs 86 formed on the exterior of the collar 80. These ribs are of larger diameter than the ribs 32 and 76, and, when the adjacent surfaces taper as indicated by the slanting line S in Fig. 3, the direction of slant is such that the surfaces increase in diameter away from the bearing instead of towards it. The stepped surfaces 84 and 86 are intended to resist leakage of gear lubricant into the bearing from a gear case 88 enclosing the drive pinion 90 and a portion of the guard 62 around which the gear case has a felt seal at 92.

Figure 4:
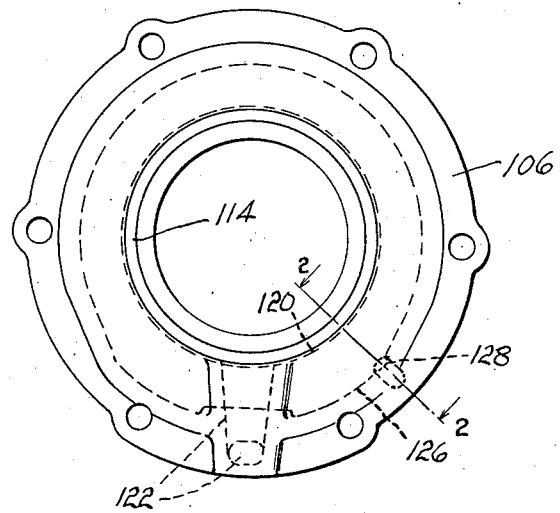
Figure 4 is an end view of one of the sealing plates or guards.

At the left end of the pinion shaft, the motor casing or end wall 94 has a seat for the outer race ring 96 of a roller bearing 98 which will take thrust as well as radial load because of the thrust shoulders 100 on the composite inner race ring. A cap plate 102 covers the end of the shaft and has an oil filler or stand pipe 104. A sealing plate or guard 106 is similar to the guard 24 with respect to the cylindrical or slightly tapered surfaces 108 surrounding ribs 110 on a collar 112 but the largest rib is not enclosed. The guard has a projection 114 with internal grease grooves surrounding a collar or sleeve 116 on the shaft. The sleeve has a rib or slinger 118 to sling leaking oil into an annular groove 120 of the guard, the bottom of the groove communicating with an inclined drain port 122 leading to the outside of the motor frame through a passage 124. The guard has a sump 126 similar to the sump 30 and provided with an overflow port 128 as indicated in Figs. 2 and 4, this port communicating by a passage 130 with a drain 132 in the cap 102, all operating similarly to the corresponding parts in Figs. 3 and 5.

Motors of this type are ventilated and cooled by driving air through the casing either by an external blower or by fan blades on the rotor. In Fig. 6, a hub 140 is fixed to a sleeve 142 which is secured to the shaft 20. Secured by screws to the hub is the web 144 of a fan or impeller which is dished around the sealing plate 24 and has radial vanes 146. Air enters the casing through a suitable screened opening at the commutator end and is driven out by the vanes through an outlet passage 148 at the bottom. The fan may create some atmospheric attenuation or suction at the final opening between the flange 46 and the extension 50. This would tend to suck air through the bearing and seal and so induce leakage of oil but such tendency is prevented by the groove 48 and the ports 52 and 54 which act as an equalizing chamber or bypass. Temperature rise is also a factor in inducing leakage. Also when an external blower is used, the groove 48 and ports 52, 54 act as an equalizing chamber to equalize the pressure and such pressure is minimized by a guard 150 (Fig. 7) which replaces the fan and closely surrounds the extension 50.

In operation, and considering the right hand portion of Fig. 1, oil admitted to the pipe 66 first runs down into the annular recess 68 and then, as it accumulates, flows across the bearing between the rollers until the oil accumulating in the opposite sump 30 begins to flow out of the overflow ports 56, 58 and 60, thereby indicating that oil held by the guard rings or sealing plates is at the desired level on the bearing and avoiding introduction of too much oil and consequent churning and heating. When the shaft rotates at high speed, some oil will be elevated by the bearing and slung into the upper portions of the annular recesses 30 and 68 whence it will be drained peripherally around the grooved projections 28 and 70 to the main body of oil at the bottom. Should any oil leak between the stepped surfaces 31 and 32 or the surfaces 74 and 76, it will be urged outwardly and laterally towards the bearing by centrifugal action especially when such surfaces taper as in Fig. 3. The prevention of leakage is further assured or enhanced by the axially arranged labyrinths, and if any oil reaches the groove 48 it is drained away by the ports 52, 54. As above noted these passages form an equalization chamber or bypass so that a fan or blower will not tend to suck or force air through the bearing and seal. The close radial clearances between the relatively rotatable parts, such as 31 and 32, prevents the leakage of any large particles axially while the larger axial clearances form annular spaces to break up the tendency to capillary flow and to permit the progressive settling or condensing of oil foam or mist to fluid state whereby such fluid can be centrifugally and progressively urged back towards the bearing or drained peripherally back to the oil sump. In the case of the stepped surfaces at 84 and 86, these prevent the admission of gear lubricant into the bearing lubricant by centrifugally urging such gear lubricant outwardly and laterally away from the bearing. At the left of Fig. 1, the stepped surfaces 108 and 110 operate similarly to surfaces 31 and 32 to prevent leakage of bearing lubricant into the motor frame. Since the shaft does not need to project at this end, the cap 102 serves as a portion of the lubricant receptacle and makes a labyrinth seal unnecessary at the left side of this bearing. The seal 106 at the commutator end can be simpler than the seal 24 at the opposite end because the aforesaid cap 102 entirely closes the opening containing the bearing 98 and hence no air can be sucked or blown through.

I claim:

1. In a device for sealing the space between a casing and a shaft which is journalled for rotation in the casing, a collar on the shaft at one side of the space and having a series of external oil slinging ribs of progressively increasing diameter, an oil retaining guard secured to the casing in a position to surround the collar and having an internally stepped portion, the steps being of progressively increasing diameter, and the corresponding steps and ribs having closely adjacent peripheral surfaces which slope away from the shaft in the same direction as the ribs progressively increase in diameter.

2. In a device for sealing the space between a casing and a shaft which is journalled for rotation in the casing, a collar on the shaft at one side of the space and having a series of external ribs of progressively increasing diameter, the adjacent ribs also being spaced axially by a slanting side wall and a peripheral groove, an oil retaining guard secured to the casing and having an internally stepped portion surrounding the collar, the steps being of progressively increasing diameter and having surfaces closely surrounding the ribs, and the side walls of the steps extending outwardly from intermediate portions of the ribs to provide annular recesses of substantial axial extent.

3. In a device for sealing the space between a casing and a shaft which is journalled for rotation in the casing, a pair of collars on the shaft at one side of the space and each having a series of external ribs of progressively increasing diameter, and an oil retaining guard having internally stepped portions closely surrounding the two series of ribs.

4. In a device for sealing the space between a casing and a shaft which is journalled for rotation in the casing, a pair of collars on the shaft at one side of the space and each having a series of external ribs of progressively increasing diameter, an oil guard having an internal projection slanting inwardly with respect to the shaft and towards the space and provided with internal steps closely surrounding one series of ribs, and another projection on the oil guard slanting inwardly with respect to the shaft and away from the space and provided with internal steps closely surrounding the other series of ribs.

5. In a device for sealing the space between a casing and a shaft which is journalled for rotation in the casing, a collar on the shaft at one side of the space and having a series of external ribs of progressively increasing diameter towards the space, an oil guard having an internally stepped portion, the steps being of progressively increasing diameter towards the space and closely surrounding the ribs, a second collar on the shaft and having a series of external ribs of progressively increasing diameter away from the space, a second internally stepped part surrounding the second collar, and the steps being of progressively increasing diameter away from the space and closely surrounding the ribs.

6. In a device for sealing the space between a casing and a shaft which is journalled for rotation in the casing, an oil retaining guard secured to the casing and having an internal annular projection slanting inwardly with respect to the shaft and towards the space, a second internal projection upon the first and slanting inwardly with respect to the shaft and away from the space, a collar on the shaft and fitting closely within the second projection, and a second collar on the shaft and fitting closely with the first projection.

7. In a device for sealing the space between a casing and a shaft which is journalled for rotation in the casing, a pair of externally stepped collars of different diameter upon the shaft, an oil retaining guard secured to the casing and having internally stepped portions closely surrounding both of the collars, and one of the stepped portions extending into a side recess in one of the collars.

OTTO W. YOUNG.